Dec. 21, 1926.
R. H. BROWN
1,611,409
BABY CARRIAGE
Filed July 17, 1922　　2 Sheets-Sheet 1
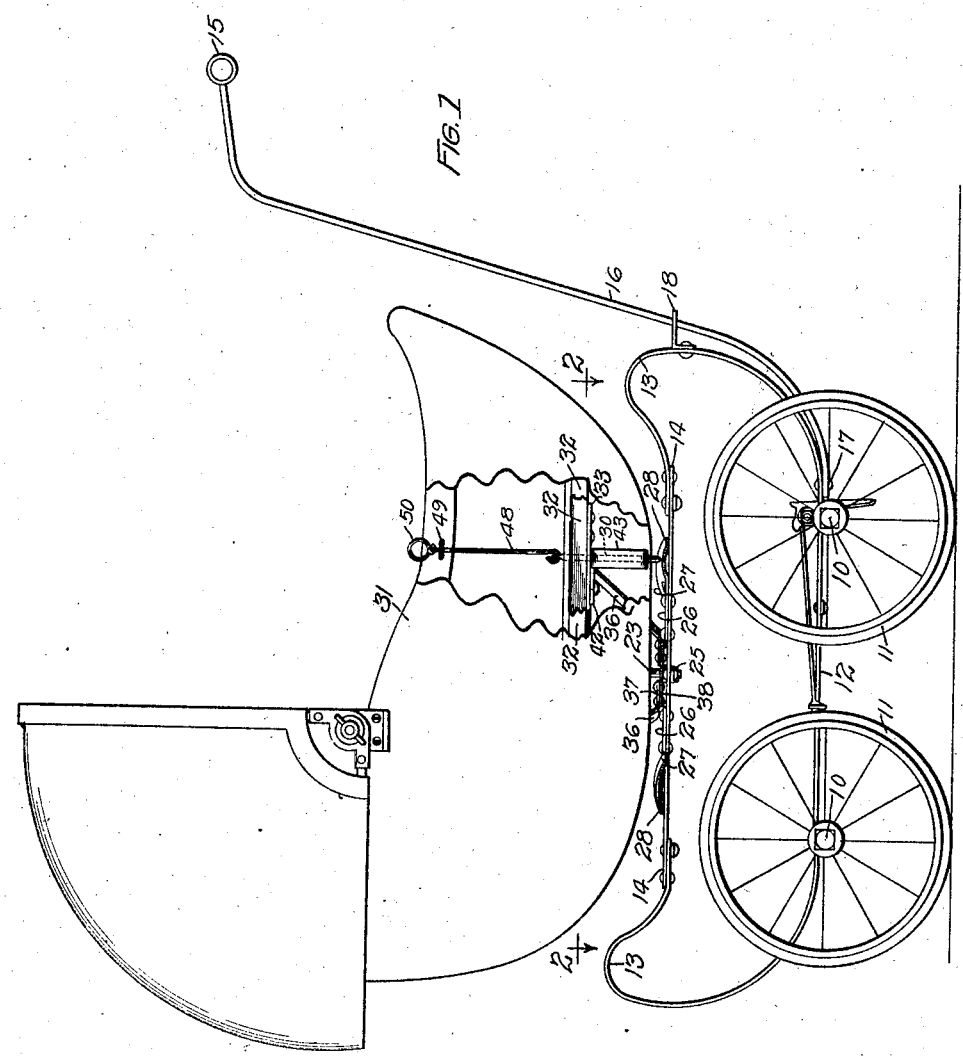
INVENTOR:
Reinhardt H. Brown,
By John Howard McElroy
HIS ATTY.

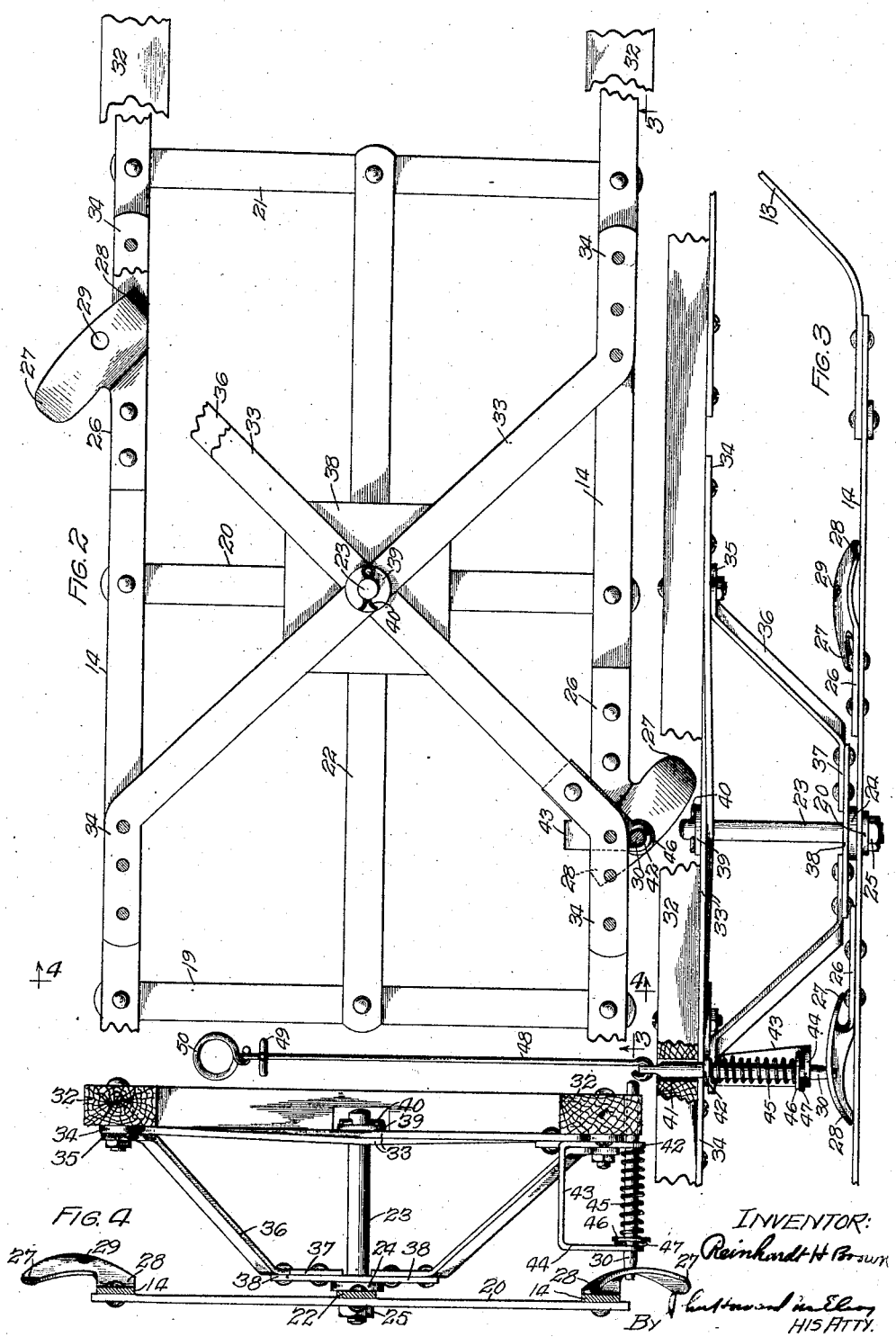

Patented Dec. 21, 1926.

1,611,409

UNITED STATES PATENT OFFICE.

REINHARDT H. BROWN, OF LA PORTE, INDIANA.

BABY CARRIAGE.

Application filed July 17, 1922. Serial No. 575,450.

My invention is concerned with baby carriages and similar vehicles, and is designed to produce such a device, in which the body can be quickly and easily reversed end for end, as is sometimes desirable under varying conditions.

My invention is further concerned with a reversible baby carriage in which the friction necessitated by the reversal is reduced to a minimum so that it can be easily effected.

To illustrate my invention, I annex hereto two sheets of drawings, in which the same reference characters are used to designate identical parts in all the figures, of which,—
Fig. 1 is a side elevation with a portion of one side of the body broken away;

Fig. 2 is a section on a much larger scale, on the line 2—2 of Fig. 1; and

Figs. 3 and 4 are sections on the lines 3—3 and 4—4, respectively, of Fig. 2.

In carrying out my invention in its preferred form, I employ a pair of axle bars 10 having the wheels 11 on the ends thereof in the customary manner, and a pair of spring side pieces 12 secured on the tops of the axle bars and having their bowed ends 13 turned over and secured to the upper running-gear side-bars 14, as shown. As a convenient method of supporting the handle 15, I employ the pair of handle rods 16, which are secured to the under sides of the spring side bars 12 at 17, and extend upward through apertures formed in the brackets 18 secured to the bowed portions of the bars 12.
The upper, running gear side-bars 14 are provided with the three cross pieces 19, 20 and 21 riveted thereto at their ends and connected by the centrally located, longitudinal bar 22 riveted to the end cross bars 19 and 21 and connected to the center cross bar 20 by the lower end of the king bolt 23, which has its reduced, threaded lower end passed through the bars 20 and 22, which are held against the collar or washer 24 secured near the lower end of the king bolt 23 by the nut 25. The side bars 14 have secured thereto at two diametrically opposite points relative to the king bolt 23 the cam plates 26, which consist of the flat portion secured to the bars 14 and the cam portions 27 and 28, which are located in the circumference of a circle described about the king bolt 23 as a center. Located in the cam plates at the high portion are the apertures 29, which co-operate with the tapered, lower end of the locking bolt 30 to be subsequently described.

The body 31 may be of any desired construction, and has secured therein the wooden side bars 32 forming a part of the customary framework and located directly over the side pieces 14, but at some distance above them. Rigidly secured to the body on the under side of the side bars 32 is a novel supplemental frame consisting of the cross pieces 33, which extend across the vehicle at an angle of 45°, having their ends 34 turned parallel to the side bars 32, to the under side of which said ends are secured. Secured to the under side of the ends 34 are the horizontal ends 35 of the inclined brace bars 36 also constituting a part of the supplemental frame, which have their lower ends 37 extending horizontally over and secured to the center plate 38, which is journaled on the king bolt 23 and rests on the upper surface of the collar 24 thereby forming a small annular bearing surface producing a minimum of friction when the body is reversed. The king bolt 23 passes through the registering apertures formed in the cross pieces 33, where they intersect, and has the washer 39 resting on the uppermost cross piece 34 and held in place by the cotter pin 40 passed through an aperture in the upper end of the king bolt.

With the construction thus far described, it will be obvious that I have a strong and simple bearing by which the body of the carriage can be rotated on the running gears with a minimum of friction, and as it is desirable to have the carriage locked automatically in the two positions which are naturally occupied, i. e., that shown in Fig. 1 and the other position at an angle of 180° thereto, I employ as a preferred form the spring-pressed bolt or plunger 30 previously mentioned, which is mounted to slide vertically in the aperture 41 formed in one of the side bars 32 directly over one of the apertures 29, and through an aperture formed in the upper horizontal portion 42 of the bracket piece, consisting of said upper, horizontal portion 42, the vertical portion 43, and the lower horizontal portion 44, the horizontal portion 42 being riveted or otherwise secured between the end 35 of the adjacent brace bar 36 and the end 34 of the cross piece 33. The bolt 30 also extends through an aperture formed in the horizontal portion 44. A helically-coiled, expanding spring 45 surrounds the bolt 30 between the horizontal portions 42 and 44, and has its lower end resting against the washer 46 held on the bolt 30 by the cotter pin 47 passed through an aperture in the bolt 30 directly beneath it. The spring-pressed bolt or plunger thus described will operate automatically to be cammed up by the surface 27 or 28, depending upon which way the body is rotating, so that it will drop into the aperture 29 and lock the body automatically when it is brought into position parallel with the running gears. To release the bolt when it is desired to shift the body, I employ any suitable means, such as the small rod 48 having its lower end hooked into an aperture formed in the upper end of the bolt 30 and its other end guided through an eye 49 secured to the inside of the body and terminating in the ring 50 by which the plunger is lifted.

While I have shown and described my invention as embodied in the form which I at present consider best adapted to carry out its purposes, it will be understood that it is capable of modifications and that I do not desire to be limited in the interpretation of the following claims except as may be necessitated by the state of the prior art.

What I claim as new, and desire to secure by Letters Patent of the United States, is:

1. In a baby carriage, the combination with a running-gear frame having front and rear wheels journaled thereon, of a reversible body member, a king bolt centrally located relative to the frame and member, an intermediate frame of a substantial depth journaled on said king bolt and supporting the body member, a bearing between said frames having a small annular bearing surface adjacent the king bolt constituting the only horizontal contact between the two frames, and locking connections between the frames to hold the body member in either position.

2. In a device of the class described, the combination with the running gear, including a pair of side bars supported at their ends by springs and cross bars supported by the side bars, and a king bolt rising from the intersection of the cross bars, of a body having a pair of side bars above the running-gear side-bars, a pair of cross bars supported from the body side-bars and journaled at their intersection upon the upper end of the king bolt, a center plate journaled on the lower end of the king bolt, downwardly inclined brace-bars connecting the body side-bars with the center plate, a spring-pressed plunger mounted to slide in a body side bar and supported near its lower end, and a pair of cam plates on the running-gear side-bars having apertures therein to co-operate with the bottom of the plunger.

In witness whereof, I have hereunto set my hand, this 15th day of July, 1922.

REINHARDT H. BROWN.